United States Patent
Passarotto

(10) Patent No.: US 6,820,668 B2
(45) Date of Patent: Nov. 23, 2004

(54) RIM FOR A BICYCLE WHEEL WITH TUBELESS TIRE

(75) Inventor: Maurizio Passarotto, Rovigo (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 10/614,226

(22) Filed: Jul. 7, 2003

(65) Prior Publication Data

US 2004/0021368 A1 Feb. 5, 2004

Related U.S. Application Data

(63) Continuation of application No. 09/919,903, filed on Aug. 2, 2001, now Pat. No. 6,588,474.

(30) Foreign Application Priority Data

Aug. 3, 2000 (IT) ..................................... TO2000A0775

(51) Int. Cl.[7] .............................................. B60C 29/02
(52) U.S. Cl. .................. 152/427; 301/5.24; 301/95.106
(58) Field of Search ........................... 301/5.24, 95.106, 301/95.101, 104; 152/427, 428

(56) References Cited

U.S. PATENT DOCUMENTS

| | | | | |
|---|---|---|---|---|
| 2,835,305 A | * | 5/1958 | Boyer ........................ 152/427 |
| 3,635,275 A | * | 1/1972 | Davis et al. ................. 152/429 |
| 4,564,056 A | * | 1/1986 | Doring ........................ 152/427 |
| 5,040,612 A | * | 8/1991 | Allen ........................... 169/62 |
| 5,211,782 A | | 5/1993 | Thelen |
| 5,746,850 A | * | 5/1998 | Luscher et al. ........... 152/339.1 |
| 6,009,895 A | | 1/2000 | Wass et al. |
| 6,119,746 A | | 9/2000 | Lacombe et al. |
| 6,145,937 A | * | 11/2000 | Chen ........................... 301/58 |
| 6,378,953 B2 | * | 4/2002 | Mercat et al. .......... 301/95.106 |

FOREIGN PATENT DOCUMENTS

| | | |
|---|---|---|
| EP | 0790141 | 5/1997 |
| EP | 0893285 | 1/1999 |
| EP | 2787064 | 6/2000 |
| JP | 10250309 | 9/1998 |

* cited by examiner

Primary Examiner—Frantz F. Jules
(74) Attorney, Agent, or Firm—Volpe and Koenig, P.C.

(57) ABSTRACT

A rim for a bicycle wheel with tubeless tire comprises a radially inner peripheral wall, a radially outer peripheral wall, two circumferential side walls which connect the inner and outer peripheral walls and form two ribs which extend beyond the outer peripheral wall, for anchorage of a tubeless tire. The inner and outer peripheral walls have two holes facing one another, within which an intermediate tubular element is mounted, connected to which is a valve body of a standard type normally used for bicycle wheels provided with inner tubes.

27 Claims, 4 Drawing Sheets

RIM FOR A BICYCLE WHEEL WITH TUBELESS TIRE

CROSS REFERENCE TO RELATED APPLICATION(S)

This application is a continuation of Ser. No. 09/919,903, filed Aug. 2, 2001, now U.S. Pat. No. 6,588,474 which is incorporated by reference as if fully set forth.

FIELD OF INVENTION

The present invention relates to rims for bicycle wheels with tubeless tires.

BACKGROUND

A rim of the type specified above is, for example, illustrated in FIG. 2 of the European patent application EP-A-0 790 141. In this known solution, the valve body is directly connected to the inner and outer peripheral walls of the rim. The problem with this rim, and those like it, is that they: 1) are expensive and difficult to manufacture the structure, 2) are slow to assemble the structure and tire, 3) leak air from the chamber defined between the tire and the outer peripheral wall of the rim, and, finally, 4) cannot use a standard valve body normally used for bicycle wheels with tires provided with inner tubes.

SUMMARY

With a view to overcoming the above shortcomings, the subject of the present invention is a bicycle wheel rim, comprising an inner radial wall having a first through hole; an outer radial wall having a second through hole aligned with the first through hole; side walls connecting the inner and outer radial walls together; and a removable tubular element located through the first and second through holes. The removable tubular element comprises a tubular body having first and second ends; an outwardly extending flange located on the first end which abuts the outer radial wall proximate to the second through hole. As described, the tubular body is of a length sufficient to cause the second end to extend inwardly beyond the inner radial wall and the rim has a valve connection compatible with a valve body for a bicycle tire. Finally, the rim has a removable locking mechanism adapted to engage the removable tubular element and to detachably secure the removable tubular member in position with the inner and outer radial walls secured between the outwardly extending flange and the locking mechanism.

BRIEF DESCRIPTION OF THE DRAWING(S)

Further characteristics and advantages of the present invention will emerge from the ensuing description, with reference to the attached drawings, provided purely by way of non-limiting example, in which.

DETAILED DESCRIPTION OF THE PREFERRED EMBODIMENT(S)

In the figures, corresponding parts are designated by the same reference numbers.

Figure 1:
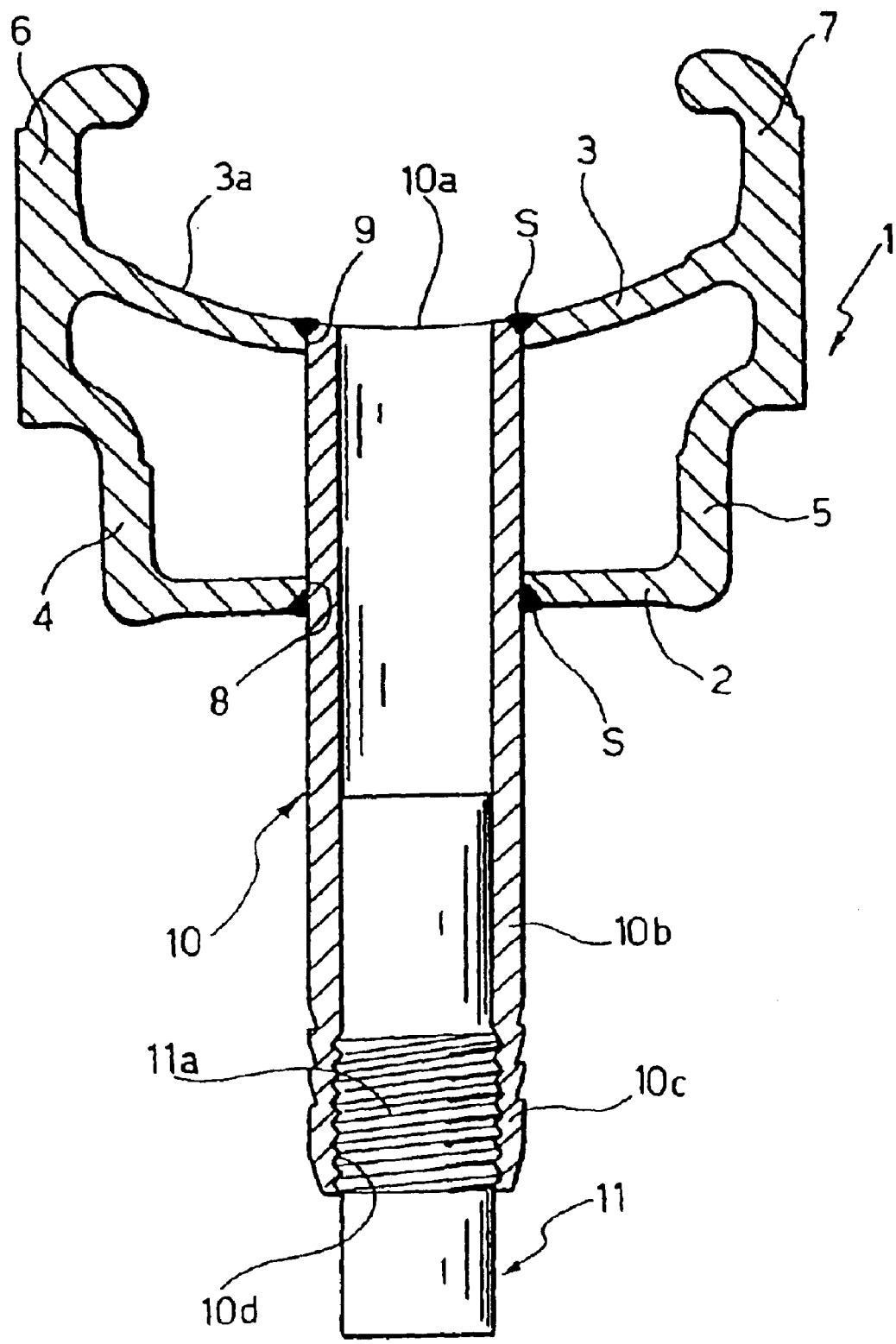
FIG. 1 is a cross-sectional view of the rim according to the invention, in a plane containing the axis of the rim and in the point where the inflating valve is mounted, according to a first embodiment of the invention.

In FIG. 1, the reference number 1 designates, as a whole, a rim for a bicycle wheel, comprising an inner peripheral wall 2, an outer peripheral wall 3, and two circumferential side walls 4, 5, which connect the two walls 2, 3 together and extend radially outwards beyond the wall 3 in such a way as to from two ribs 6, 7 that anchor a tubeless tire (not illustrated). In the area where tire inflating valve is to be mounted, the two walls 2, 3 have two holes 8, 9 facing one another, which have a common axis in the radial direction with respect to the axis of the rim. The rim's edges are fixed to an intermediate tubular element 10 by means of welds or other bonding means S. The tubular element 10 has an end front surface, radially facing outwards and designated by 10a. The surface 10a is shaped and set flush with the external surface 3a of the outer peripheral wall 3 of the rim. In addition, the intermediate tubular element 10 has a portion 10b, which projects beyond the inner peripheral wall 2 in the direction of the axis of the rim (not illustrated) and which terminates with an end portion 10c that has an internal thread 10d. The reference number 11 designates a valve body (illustrated only schematically) of the standard type normally used for bicycle wheels with tires provided with inner tubes. The internal structure of the valve body 11 is not illustrated in so far as it is in itself known. The valve body 11 has an intermediate threaded portion 11a, which is screwed into the threaded portion 10d of the tubular element 10.

Figure 2:
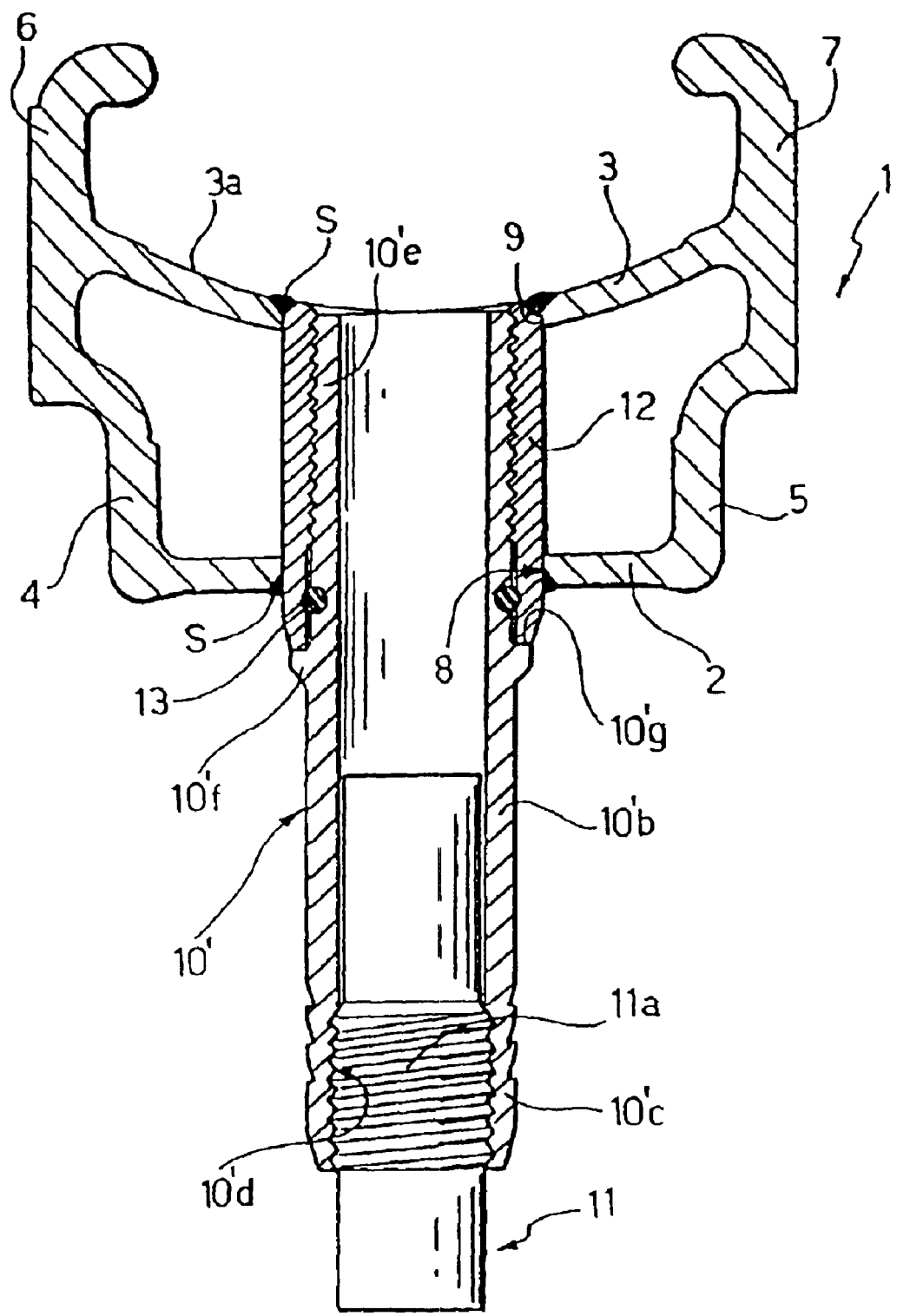
FIG. 2 illustrates a first example of the second embodiment of the invention.

FIG. 2 illustrates a second embodiment, in which the intermediate tubular element 10' is irremovably connected to the rim 1. In the case of the example of FIG. 2, the intermediate tubular element 10' has a radially external end portion 10'e threaded on the outside and screwed into the internal threaded surface of a bushing 12. The ends of the bushing 12 are bonded or welded (by means of welds or other bonding means S) within the edges of the holes 8, 9. The end portion 10'e of the intermediate tubular element 10' is provided with an O-ring 13 received in a circumferential groove of said portion 10'e and pressed into contact with the internal surface of the bushing 12 to ensure tightness for preventing air from coming out of the tire chamber, which is defined between the tire itself (not shown) and the outer peripheral wall 3 of the rim. Furthermore, the intermediate tubular element 10' has a collar 10'f with an annular contact surface 10'g, which is in contact with the radially internal end surface of the bushing 12.

The embodiment illustrated in FIG. 2 has a slightly more complicated structure than that of the example of FIG. 1, but affords the advantage that it enables easy and fast conversion of the rim into a rim that can be used with a tire provided with an inner tube. In this case, in fact, it is sufficient to unscrew the intermediate tubular element 10' to remove it, after which the inner tube of the tire can be mounted in a conventional way, inserting the valve body associated to it through the internal passage of the bushing 12.

Figure 3:
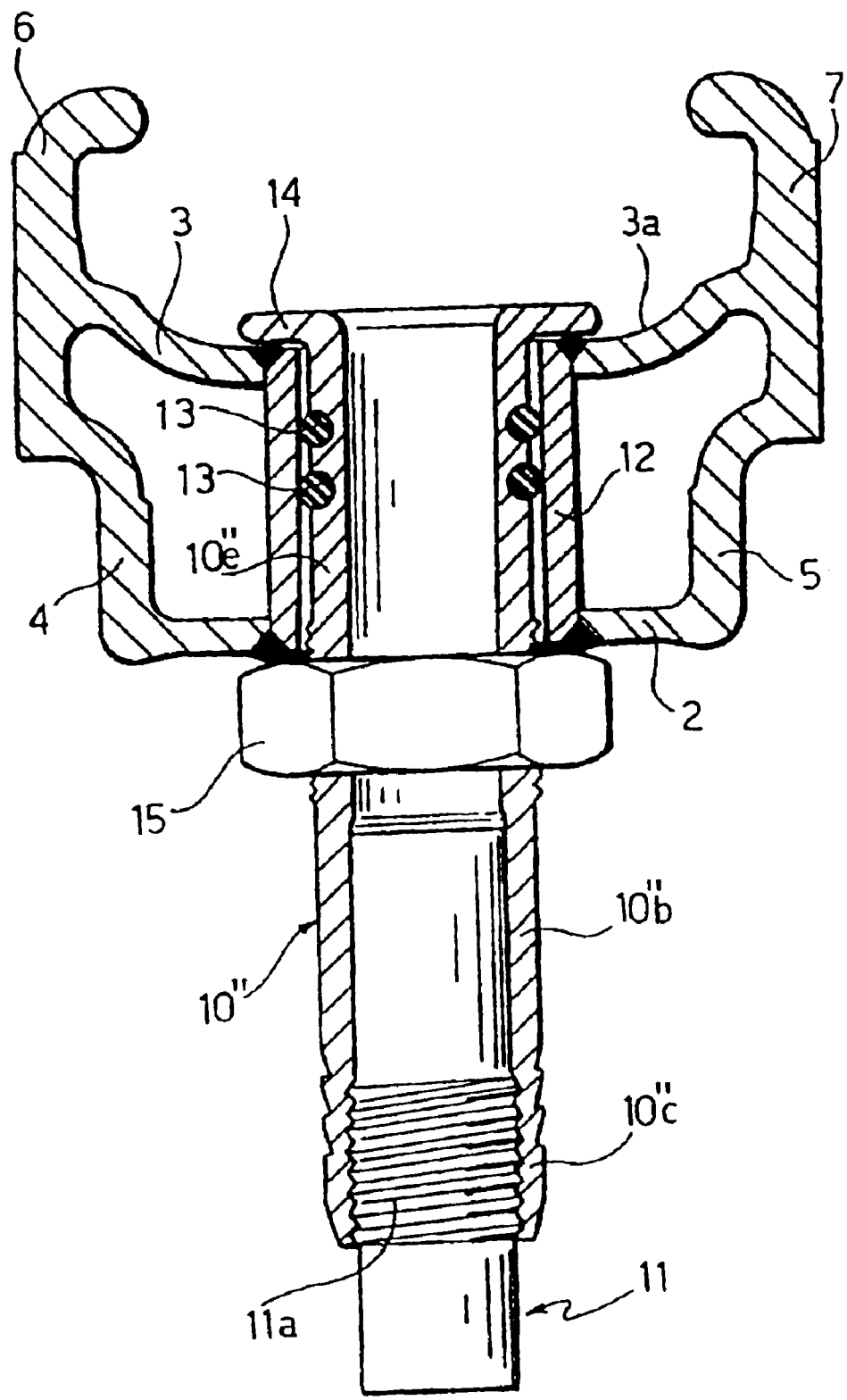
FIGS. 3 and 4 illustrate two further examples of said second embodiment.
Figure 4:
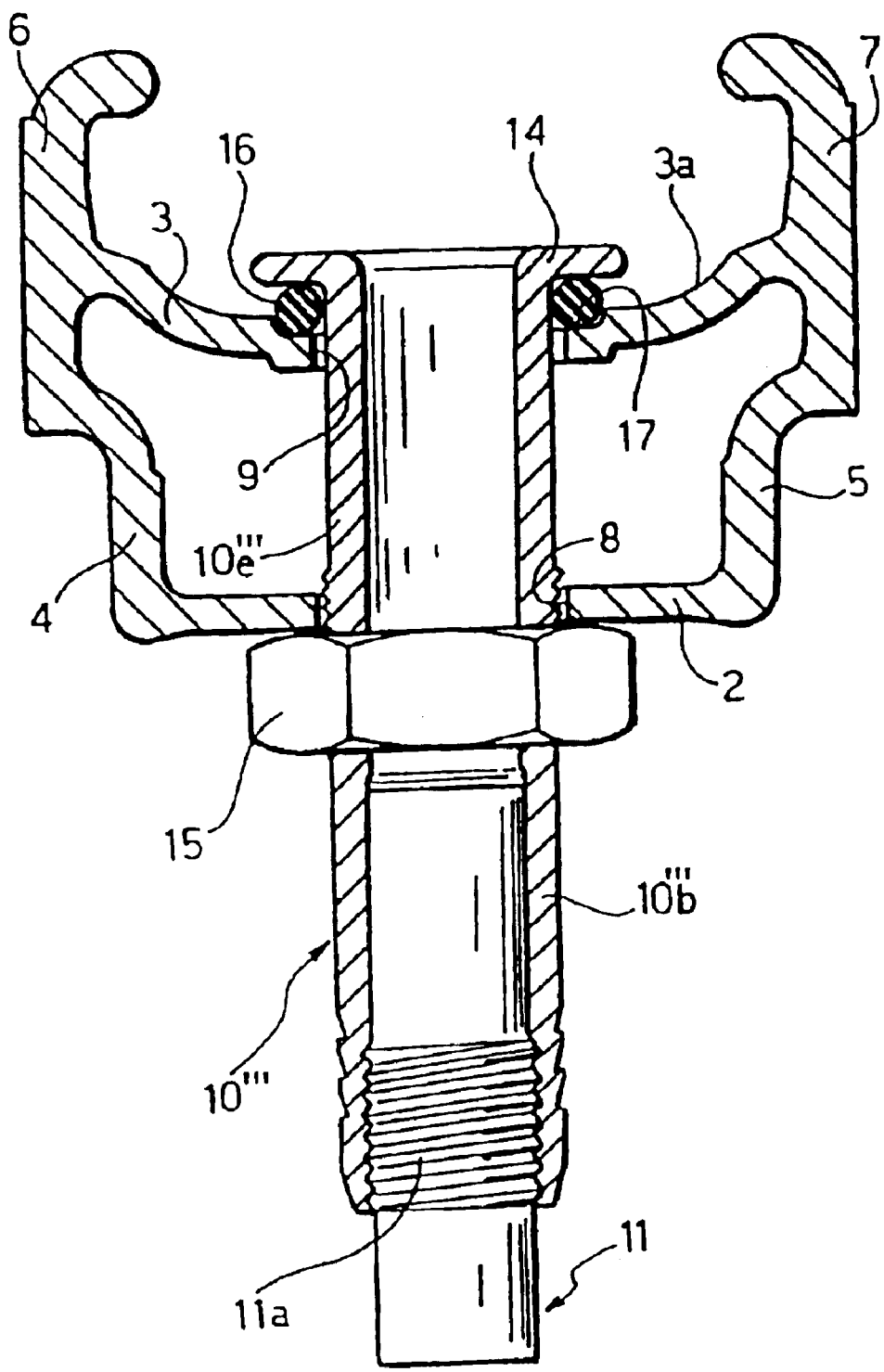

FIG. 3 illustrates a variant of FIG. 2, in which the disconnectable connection of the intermediate tubular element 10" inside the bushing 12 is obtained in a different way. In this case, in fact, the intermediate tubular element 10' has, at its radially external end, a widened head 14, which rests on the external surface 3a of the outer peripheral wall 3. In addition, the part 10"b of the intermediate tubular element 10", which projects beyond the inner peripheral wall 2, is threaded to allow screwing of a nut 15, which has the function of securing the intermediate element 10" to the rim, pulling the head 14 against the resting surface 3a. In the case of the example of FIG. 3, moreover, the intermediate tubular element 10" is provided with two O-rings 13 received in respective circumferential grooves of the intermediate tubular element 10". Also the solution of FIG. 3 obviously enables easy adaption of the rim to a tire provided with inner tube. The example of FIG. 4 differs from that of FIG. 3 mainly on account of the elimination of the bushing 12. In this case, tightness is ensured by a single O-ring 16 that is received in a front circumferential groove 17 made in the surface 3a along the edge of the hole 9. The latter solution is preferred in the case of a rim made of a composite material, for instance reinforced with carbon fiber, or in the case of a rim made of light alloy, on account of the absence of welds or other bonding means. Instead of the O-ring 16, any other sealing means may also be used, for example in the form of an adhesive. In addition, the head 14 can be shaped so as to adapt to the profile of the surface 3a in a harmonious way.

Thanks to the above-mentioned characteristics, the described rim affords numerous advantages. First, the valve body used in the rim according to the invention may be a valve body of a standard type used for rims with tires provided with inner tubes. Second, the structure of the rim is simple and inexpensive and enables simple and fast operations both of assembly of the tire and of assembly of the valve body. Finally, when intermediate tubular element is connected in a removable way to the rim, the rim can be used with a tire provided with inner tube. In this case, it is sufficient to remove the intermediate tubular element and mount the inner tube with the corresponding valve body in the traditional way, inserting the valve body through the two holes facing one another that are made in the outer and inner peripheral walls of the rim, as well as through the aforesaid bushing in the examples of embodiment where the latter is present.

From the foregoing description it is evident that the rim according to the invention has a structure that is relatively simple and inexpensive, while at the same time being air tight inside the chamber of the tire. It further enables operations of assembly and disassembly to be carried out in a simple and rapid way, and, finally, makes possible, in the case of the aforesaid second embodiment referred to in the examples of FIGS. 2, 3 and 4, an easy and rapid adaptation of the rim to a tire having an inner tube.

Of course, without prejudice to the principle of the invention, the details of construction and the embodiments may vary widely with respect to what is described and illustrated herein purely by way of example, without thereby departing from the scope of the present invention.

What is claimed is:

1. A bicycle wheel rim, comprising:
   an inner radial wall having a first through hole;
   an outer radial wall having a second through hole aligned with the first through hole;
   side walls connecting the inner and outer radial walls together; and
   a removable tubular element located through the first and second through holes, the removable tubular element further comprising:
   a tubular body having first and second ends;
   an outwardly extending flange located on the first end which abuts the outer radial wall proximate to the second through hole;
   the tubular body having a length sufficient to cause the second end to extend inwardly beyond the inner radial wall;
   a valve connection compatible with a valve body for a bicycle tire;
   a removable locking mechanism adapted to engage the removable tubular element and to detachably secure the removable tubular member in position with the inner and outer radial walls secured between the outwardly extending flange and the locking mechanism;
   wherein when the removable tubular member is detached from the inner and outer radial walls, the rim can be use with an optional inner tube of the tire.

2. The rim of claim 1, wherein the locking mechanism comprises a nut that is securable to an outer surface of the removable tubular member, the inner and outer radial walls being secured between the flange and the nut.

3. The rim of claim 1, further comprising the valve body rigidly connected to the second end of the removable tubular element for inflating a chamber defined between a tire and the outer radial wall.

4. The rim of claim 1, further comprising a bushing located between the inner and outer radial walls and defining a passage between the first and second through holes, the removable tubular element is removably disposed through the bushing, wherein the bushing prevents radial displacement of the inner and outer radial walls, relative to each other, when the removable tubular member is secured therein by the locking mechanism.

5. The rim of claim 4, wherein at least one seal is located between the bushing and the removable tubular member.

6. The rim of claim 5, wherein the at least one seal comprises an O-ring located in a peripheral groove in an outer surface of the removable tubular member.

7. The rim of claim 1, wherein the second end of the removable tubular member is threaded to receive the valve body.

8. The rim of claim 1, wherein the removable tubular member is formed of rigid material.

9. The rim of claim 1, wherein the outwardly extending flange extends generally perpendicularly to a longitudinal axis of the removable tubular member to form a widened head.

10. The rim of claim 1, wherein at least one seal is disposed between the outwardly extending flange of the removable tubular member and the outer radial wall.

11. The rim of claim 10, wherein the at least one seal comprises an O-ring located in a peripheral groove in the outer radial wall.

12. An adjustable bicycle wheel rim, comprising:
   an outer radial wall defining an external surface, facing generally radially outwardly, and having a through hole;
   two side walls disposed on the outer radial wall and being capable of engaging, at separate times, both a tubeless bicycle tire and a bicycle tire having an inner tube;
   a tubular element having a first position, in which the tubular element is positioned in the through hole, and a second position, in which the tubular element is removed from the through hole so that the rim can be used with an optional inner tube of the tire, the tubular element comprising:
   tubular body having first and second ends;
   an outwardly extending flange located on the first end which prevents passage of the first end through the through hole;
   the second end adapted to extend inwardly from the outer radial wall when the tubular element is in the first position;
   a valve connection compatible with a valve body for a bicycle tire; and a removable locking mechanism adapted to detachably secure the tubular member in the first position with the outer radial wall secured between the outwardly extending flange and the locking mechanism, wherein when the tubular member is in the second position, the rim can be used with an inner tube of the tire.

13. The rim of claim 12, wherein the locking mechanism comprises a nut that is securable to an outer surface of the tubular member, the outer radial wall being secured between the flange and the nut.

14. The rim of claim 13, further comprising a valve body rigidly connected to the second end of the tubular element for inflating a chamber defined between the tire and the external surface.

15. The rim of claim 12, further comprising a bushing located in the through hole of the outer radial wall, wherein the tubular element is disposed through the bushing when in the installed configuration.

16. The rim of claim 12, wherein the second end of the tubular member is threaded to receive the valve body.

17. The rim of claim 12, wherein the tubular member is formed of rigid material.

18. The rim of claim 12, wherein at least one seal is disposed between the flange of the tubular member and the external surface of the outer radial wall.

19. The rim of claim 18, wherein the at least one seal comprises an O-ring located in a peripheral groove in the external surface of the outer radial wall.

20. A bicycle wheel rim, comprising:
   an inner wall having a first aperture;
   an outer wall having a second aperture aligned with the first aperture;
   side walls connecting the inner and outer walls together defining opposed ribs for engaging a tubeless tire; and
   a removable tubular element located through the first and second apertures wherein when the tubular element is removed, the rim can be used with an optional inner tube of the tire; the removable tubular element further comprising:
   a tubular body having a first end with a flange that abuts the outer radial wall and a sufficient length to permit a second end of the body to extend through the first aperture and beyond the inner radial wall;
   a valve body within the tubular body for controlling inflation of a chamber formed between the outer radial wall and a bicycle tire; and
   a removable locking mechanism that draws the flange against the outer radial wall and secures the removable tubular element within the first and second apertures.

21. The rim of claim 20 further comprising a bushing located between the inner and outer radial wails and defining a passage between the first and second apertures that receives the removable tubular element and prevents radial displacement of the inner and outer radial walls when the removable tubular member is secured by the locking mechanism.

22. The rim of claim 21 wherein at least one seal is located between the bushing and the removable tubular member.

23. The rim of claim 22 wherein the at least one seal comprises an O-ring located in a peripheral groove in an outer surface of the removable tubular member.

24. The rim of claim 20 wherein the second end of the removable tubular member is threaded to receive the valve body.

25. The rim of claim 20 wherein at least one seal is disposed between the outwardly extending flange of the removable tubular member and the outer radial wall.

26. The rim of claim 20 wherein the at least one seal comprises an O-ring located in a peripheral groove in the outer radial wall.

27. A bicycle wheel rim, comprising:
   an inner radial wall having a first through hole;
   an outer radial wall having a second through hole aligned with the first through hole;
   side walls for spacing the inner and outer wall apart by a predetermined distance and connecting the inner and outer radial walls together; and
   a tubular body having first and second ends and a length greater than the predetermined distance between the inner and outer radial walls;
   a removable tubular element located through the first and second through holes;
   a weld that retains the first end of the tubular body adjacent to the outer radial wall proximate to the second through hole with the second end extending inwardly beyond the inner radial wall;
   a valve connection compatible with a valve body for a bicycle tire;
   a removable locking mechanism adapted to removably engage the removable tubular element to the tubular body.

* * * * *

UNITED STATES PATENT AND TRADEMARK OFFICE
CERTIFICATE OF CORRECTION

PATENT NO. : 6,820,668 B2
DATED : November 23, 2004
INVENTOR(S) : Maurizio Passarotto It is certified that error appears in the above-identified patent and that said Letters Patent is hereby corrected as shown below:

Column 4,
Line 59, before the word "tubular" insert the word -- a --.

Column 6,
Line 5, after the word "radial", delete "wails" and insert therefor -- walls --.

Signed and Sealed this

Twenty-second Day of February, 2005

JON W. DUDAS
*Director of the United States Patent and Trademark Office*